US010005334B2

(12) United States Patent
Ando et al.

(10) Patent No.: US 10,005,334 B2
(45) Date of Patent: Jun. 26, 2018

(54) SHOCK ABSORBER

(71) Applicants: KYB Corporation, Tokyo (JP);
HONDA MOTOR CO., LTD., Tokyo (JP)

(72) Inventors: Kazuma Ando, Gifu (JP); Yasutaka Ohta, Saitama (JP); Koji Takami, Saitama (JP)

(73) Assignees: KYB Corporation, Tokyo (JP);
HONDA MOTOR CO., LTD., Tokyo (JP)

( * ) Notice: Subject to any disclaimer, the term of this patent is extended or adjusted under 35 U.S.C. 154(b) by 0 days. days.

(21) Appl. No.: 15/126,179

(22) PCT Filed: Mar. 17, 2015

(86) PCT No.: PCT/JP2015/057916
§ 371 (c)(1),
(2) Date: Sep. 14, 2016

(87) PCT Pub. No.: WO2015/146719
PCT Pub. Date: Oct. 1, 2015

(65) Prior Publication Data
US 2017/0080768 A1     Mar. 23, 2017

(30) Foreign Application Priority Data
Mar. 28, 2014  (JP) ................. 2014-067926

(51) Int. Cl.
*B60G 15/06*  (2006.01)
*F16F 1/12*  (2006.01)

(52) U.S. Cl.
CPC ............ *B60G 15/063* (2013.01); *F16F 1/126* (2013.01); *B60G 2204/12422* (2013.01)

(58) Field of Classification Search
CPC .......... F16F 1/12; F16F 1/126; B60G 15/062; B60G 15/063; B60G 2204/1242; B60G 2204/12422
USPC .......................... 267/170, 178; 280/124.179
See application file for complete search history.

(56) References Cited

U.S. PATENT DOCUMENTS

| 5,249,781 | A |   | 10/1993 | Wohler |
| 5,470,049 | A | * | 11/1995 | Wohler ................. B60G 11/16 267/170 |
| 6,149,171 | A | * | 11/2000 | Bono ..................... B60G 11/16 280/124.179 |

(Continued)

FOREIGN PATENT DOCUMENTS

| DE | 4104859 C1 | 7/1992 |
| DE | 102008022437 A1 * | 11/2009 ........... B60G 15/063 |

(Continued)

*Primary Examiner* — Thomas J Williams
(74) *Attorney, Agent, or Firm* — Hauptman Ham, LLP (57) ABSTRACT

A shock absorber includes a shock absorber body, a suspension spring, a spring seat, and a spring rubber seat. The seat surface of the spring rubber seat is formed inclined so as to be higher toward a distal end within a predetermined range from the distal end where a spiral portion of the suspension spring becomes apart to a side where the spiral portion of the suspension spring abuts. A concave portion surrounded by a portion abutting on the spring seat is formed on a lower side of the predetermined range in a lower part of the spring rubber seat.

4 Claims, 7 Drawing Sheets

(56) References Cited

U.S. PATENT DOCUMENTS

| | | | | |
|---|---|---|---|---|
| 6,273,407 B1 * | 8/2001 | Germano | ............ | B60G 13/005 |
| | | | | 267/172 |
| 9,499,021 B2 * | 11/2016 | Nakano | ................ | B60G 11/16 |
| 2016/0031280 A1 * | 2/2016 | Arano | .................... | B60G 11/16 |
| | | | | 267/219 |

FOREIGN PATENT DOCUMENTS

| | | | | | |
|---|---|---|---|---|---|
| DE | 102015216736 A1 * | 4/2016 | | ............ | B60G 11/52 |
| JP | 58-180309 A | 10/1983 | | | |
| JP | 4746736 B | 8/2011 | | | |
| JP | 2012-219825 A | 11/2012 | | | |
| JP | 5961128 B2 * | 8/2016 | | ............ | B60G 11/16 |

\* cited by examiner

SHOCK ABSORBER

TECHNICAL FIELD

The present invention relates to a shock absorber.

BACKGROUND ART

In a general vehicle, a shock absorber is interposed between a chassis and a wheel to alleviate a shock caused by road surface unevenness and improve a riding comfort.

The shock absorber includes a suspension spring configured to elastically support the chassis and absorb a shock caused by a road surface unevenness and a shock absorber body configured to generate a damping force for suppressing an expanding and contracting motion caused by shock absorption of the suspension spring. The suspension spring is a coil spring formed by winding a wire rod formed of a metal material such as iron.

If a lower end of the suspension spring is supported on a dish-shaped spring seat installed in the outer circumference of the shock absorber body, a spring rubber seat formed of an elastic body such as rubber may be interposed between the suspension spring and the spring seat (for example, see JP 4746736 B).

By installing the spring rubber seat, it is possible to suppress an abnormal noise caused by friction generated between the suspension spring and the spring seat along with expansion or compression of the suspension spring. In addition, it is possible to suppress the generation of rust due to a damage that may be generated thereby.

SUMMARY OF INVENTION

Here, a spring cap corresponding to the spring rubber seat discussed in JP 4746736 B is provided with a notch on a lower surface side within a predetermined range from a distal end where a spiral portion of the suspension spring becomes apart to a side where the spiral portion of the suspension spring abuts. As a result, the rigidity of the spring cap is lowered within the predetermined range from the distal end, so that it is possible to improve followability of the spring cap to deformation generated in the event of expansion or compression of the suspension spring.

However, since this notch is horizontally opened to pass radially through the annular spring cap, a foreign matter such as gravel or dust may be easily intruded. As a result, it is conceived that the foreign matter is bitten between the spring cap and a support member that supports the spring cap.

In the shock absorber discussed in JP 4746736 B, the spring cap is supported by a spring seat (spring pan) via a support member. Therefore, a foreign matter intruded into the notch of the spring cap does not damage the spring seat.

However, if a notched spring rubber seat is directly supported by the spring seat in order to reduce the number of components (for example, see JP 2012-219825 A), a foreign matter bitten between the spring seat and the spring rubber seat may damage the spring seat.

The present invention has an object to provide a shock absorber capable of improving followability of the spring rubber seat to deformation caused in the event of expansion or compression of the suspension spring and suppressing biting of a foreign matter between the spring rubber seat and the spring seat.

According to one aspect of the present invention, a shock absorber includes a shock absorber body; a suspension spring provided in an outer circumference of the shock absorber body; a spring seat installed in the outer circumference of the shock absorber body and configured to support a lower end of the suspension spring; and a spring rubber seat interposed between the spring seat and the suspension spring and provided with a seat surface on which the suspension spring is seated. The seat surface of the spring rubber seat is formed inclined so as to be higher toward a distal end within a predetermined range from the distal end where a spiral portion of the suspension spring becomes apart to a side where the spiral portion of the suspension spring abuts. A concave portion surrounded by a portion abutting on the spring seat is formed on a lower side of the predetermined range in a lower part of the spring rubber seat.

DESCRIPTION OF EMBODIMENTS

A shock absorber 100 according to an embodiment of the invention will now be described with reference to the accompanying drawings.

Figure 1:
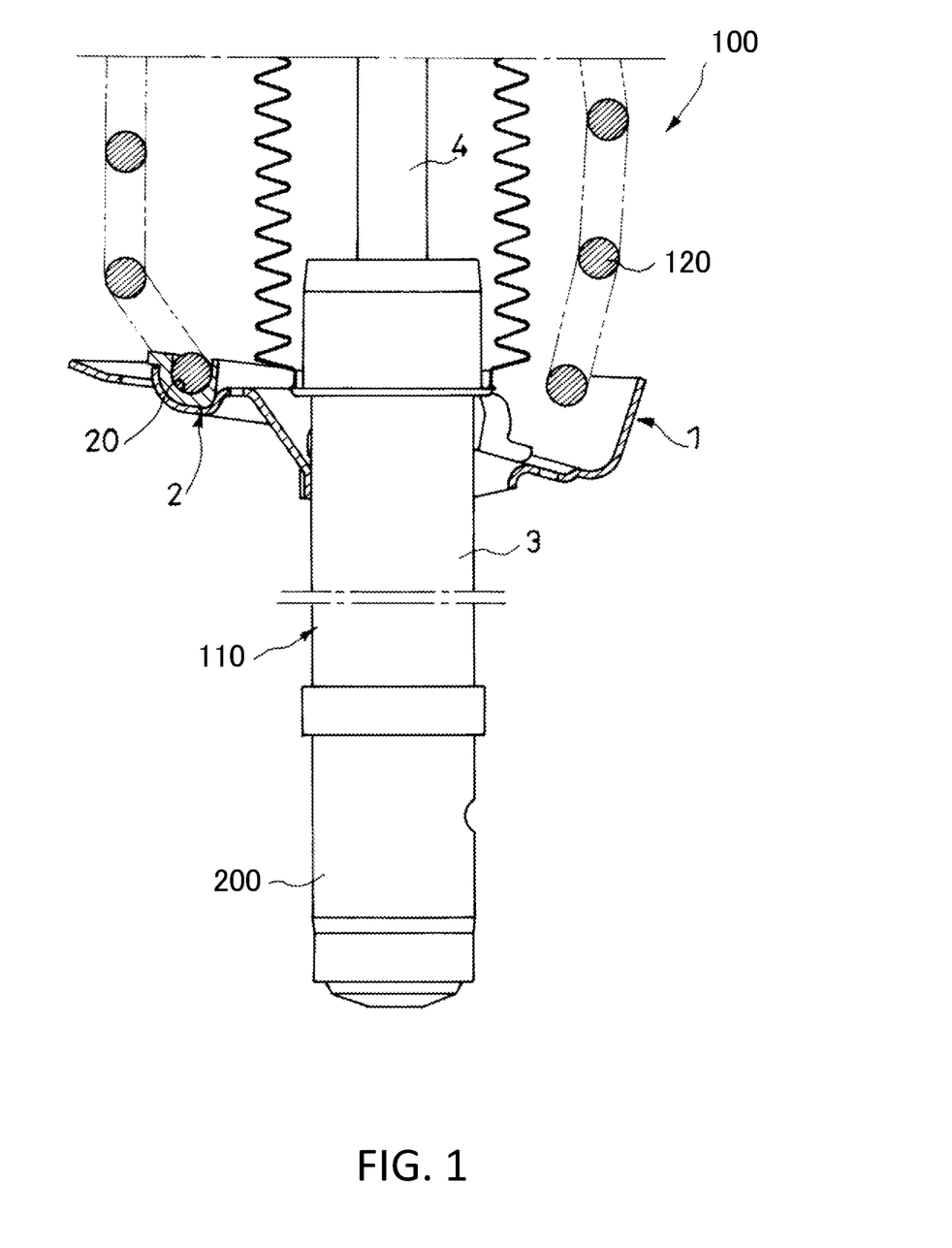
FIG. 1 is a front view illustrating a shock absorber according to an embodiment of the invention.

As illustrated in FIG. 1, the shock absorber 100 includes a shock absorber body 110, a suspension spring 120 provided in an outer circumference of the shock absorber body 110, a spring seat 1 installed in the outer circumference of the shock absorber body 110 to support a lower end of the suspension spring 120, and a spring rubber seat 2 interposed between the spring seat 1 and the suspension spring 120.

Figure 7:
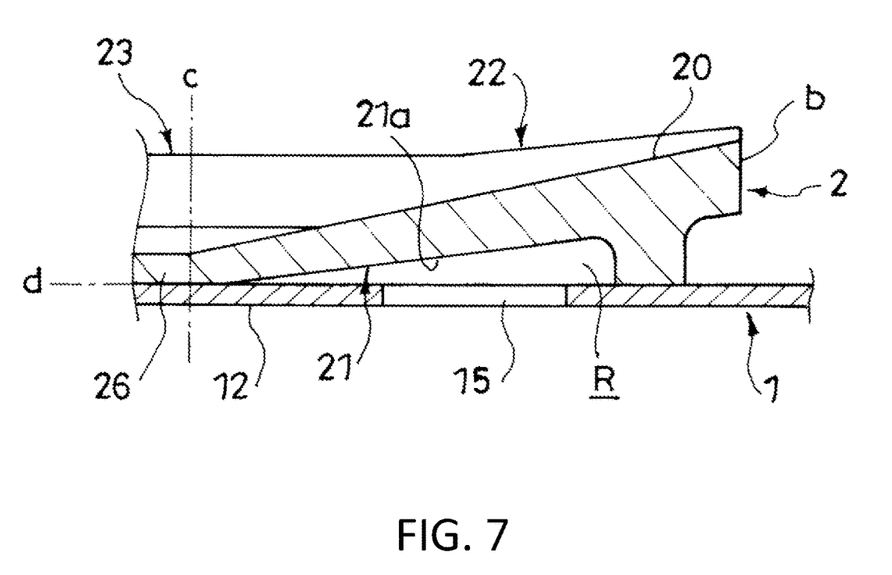
FIG. 7 is a partial cross-sectional view illustrating a state in which the spring rubber seat is installed in the spring seat.

A seat surface 20 where the suspension spring 120 is seated is formed on an upper part of the spring rubber seat 2. As illustrated in FIG. 7, the seat surface 20 is inclined so as to be higher toward a distal end b within a predetermined range "b" to "c" from the distal end "b" where a spiral portion of the suspension spring 120 becomes apart to a side where the spiral portion abuts. In addition, a concave portion 21 surrounded by a portion abutting on the spring seat 1 is formed on a lower side of the predetermined range where the seat surface 20 is inclined in the lower part of the spring rubber seat 2.

Now, the shock absorber 100 according to an embodiment of the invention will be described in more detail.

As illustrated in FIG. 1, the shock absorber 100 includes a shock absorber body 110, a suspension spring 120 which is a coil spring provided in the outer circumference of the shock absorber body 110, a pair of upper and lower spring seats configured to support the suspension spring 120 (in the drawings, only the lower spring seat 1 is illustrated, and the upper spring seat is not illustrated for simplicity purposes), spring rubber seats interposed between each spring seat and the suspension spring 120 (only the spring rubber seat 2 interposed between the lower spring seat 1 and the suspension spring 120 is illustrated, and the spring rubber seat interposed between the upper spring seat and the suspension spring 120 is not illustrated for simplicity purposes). The shock absorber body 110 is interposed between a chassis-side mount (not shown) connected to the vehicle chassis side and a wheel-side bracket 200 connected to the wheel side. Note that the spring rubber seat and the upper spring seat not shown in the drawings are well known in the art, and they are not described herein for simplicity purposes.

The shock absorber body 110 has a cylinder 3 connected to the wheel-side bracket 200 and a rod 4 axially movably inserted into the cylinder 3 and provided with one end formed to protrude from the cylinder 3 and connected to the chassis-side mount (not shown).

The shock absorber body 110 is an upright type and exerts a damping force for suppressing a relative axial movement between the rod 4 and the cylinder 3. The structure for exerting the damping force is well known in the art and is not described herein for simplicity purposes.

The configuration of the shock absorber body 110 is not limited to those described above and may change appropriately. For example, the shock absorber body 110 may be an inverted type in which the rod 4 is connected to the wheel side, and the cylinder 3 is connected to the chassis side. In addition, the shock absorber body 110 according to this embodiment is a mono-tube type, in which an expandable and contractible air chamber for compensating for a cylinder volume change caused by an advancing and retracting motion of the rod into and out of the cylinder 3 is provided. Alternatively, the shock absorber body 110 may also be a twin-tube type having inner and outer cylinders. In this case, the cylinder volume change caused by the advancing and retracting motion of the rod is compensated by a reservoir provided between the inner and outer cylinders.

The suspension spring 120 provided in the outer circumference of the shock absorber body 110 is a coil spring formed by winding a wire rod formed of a metal material such as iron. The suspension spring 120 is interposed between the upper spring seat installed in the chassis-side mount (not shown) and the lower spring seat 1 installed in the outer circumference of the cylinder 3. As a result, the upper end of the suspension spring 120 is supported by the chassis side, and the lower end is supported by the wheel side. Furthermore, the suspension spring 120 is expanded or compressed depending on a relative axial movement between the cylinder 3 and the rod 4 to elastically support the chassis.

Figure 2:
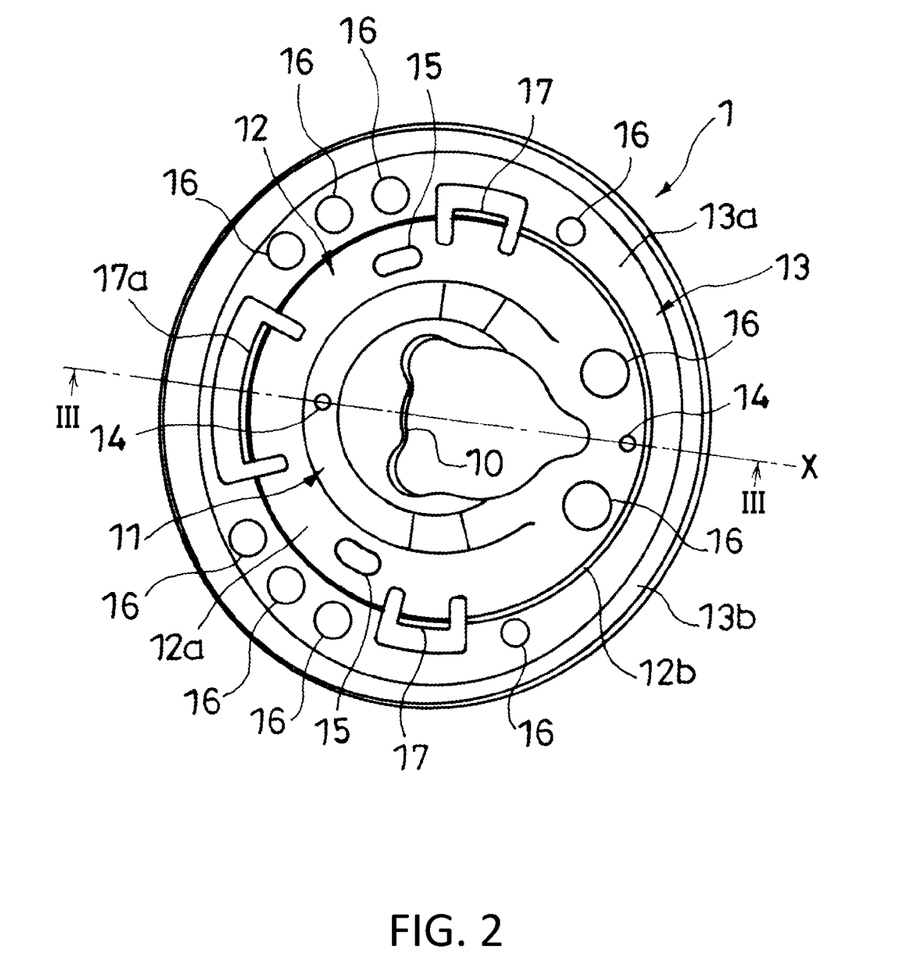
FIG. 2 is a top plan view illustrating a spring seat.
Figure 3:
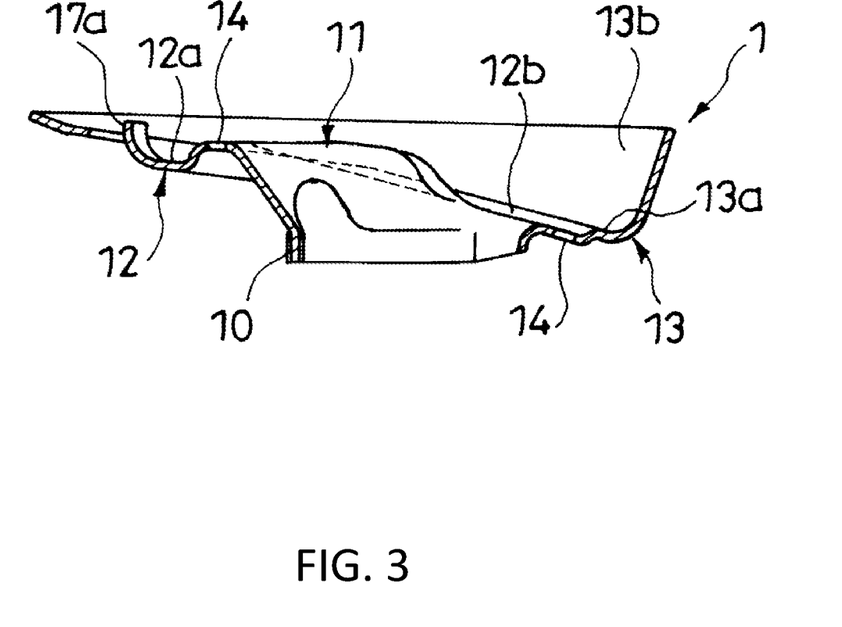
FIG. 3 is a cross-sectional view taken along the line III-III of FIG. 2.

The lower spring seat 1 that supports the lower end of the suspension spring 120 is a dish-shaped member formed of metal such as iron. As illustrated in FIGS. 2 and 3, the lower spring seat 1 has a tubular connecting portion 10 configured to receive the cylinder 3 inserted into its inside and welded to the cylinder 3, a protruding part 11 provided in an outer circumference of the connecting portion 10 and formed in an arc shape as seen in a top plan view, an annular support portion 12 provided in an outer circumference of the protruding part 11, and an annular pan portion 13 provided in an outer circumference of the support portion 12.

According to this embodiment, the spring seat 1 is axially symmetrically shaped with respect to the one-dotted chain line X of FIG. 2. As a result, the spring seat 1 can be used for both a spring rubber seat 2 where a right-hand wound suspension spring 120 is seated and a spring rubber seat where a left-hand wound suspension spring is seated (not shown).

The protruding part 11 extends to the outer circumferential side while it rises from the connecting portion 10. The support portion 12 is depressed from the protruding part 11 so that the spring rubber seat 2 can be fitted.

The support portion 12 has an outer circumferential wall 12b installed with two small support pieces 17 integrally linked from the wall 12b to the upper side and a single support piece 17a. As a result, it is possible to prevent the spring rubber seat 2 from being removed from the support portion 12.

The pan portion 13 has an annular bottom 13a linked to the upper end of the wall 12b and an outer peripheral edge portion 13b erected obliquely upward from an outer circumferential end of the bottom 13a. As a result, it is possible to prevent the suspension spring 120 from falling from the spring seat 1 when the suspension spring 120 is broken by an excessive input force.

A water drain hole 14 is formed in each of the top (not shown) of the protruding part 11 and the bottom 12a of the support portion 12. These two water drain holes 14 are provided on the one-dotted chain line X.

On the bottom 12a of the support portion 12, two lightening holes 15 is provided. These two lightening holes 15 are provided on both sides with respect to the one-dotted chain line X.

A plurality of lightening holes 16 is formed on each of the bottom 12a of the support portion 12 and the bottom 13a of the pan portion 13. The plurality of lightening holes 16 is provided on both sides with respect to the one-dotted chain line X. All of the lightening holes 15, the water drain holes 14, and the lightening holes 16 vertically penetrate through the spring seat 1.

As described above, the spring seat 1 is formed axially symmetrically with respect to the one-dotted chain line X. Therefore, the elements of the spring seat 1 such as the connecting portion 10, the protruding part 11, the support portion 12, the pan portion 13, the water drain holes 14, the lightening holes 15, the lightening holes 16, the small support pieces 17, and the support piece 17a are shaped and arranged axially symmetrically with respect to the one-dotted chain line X.

Note that the configuration of the spring seat 1 may change appropriately. For example, the arrangements or shapes of the connecting portion 10, the protruding part 11, the support portion 12, and the pan portion 13 may change appropriately. In addition, the numbers or shapes of the water drain holes 14, the lightening holes 15, the lightening holes 16, the small support pieces 17, and the support pieces 17a may change appropriately.

According to this embodiment, a wheel is installed in the left side of the wheel-side bracket 200 in FIG. 1. For this reason, the bottom 12a of the support portion 12 and the bottom 13a of the pan portion 13 are inclined so as to be higher on the left side in FIG. 1. However, the shapes of the support portion 12 and the pan portion 13 are not limited thereto.

Figure 4:
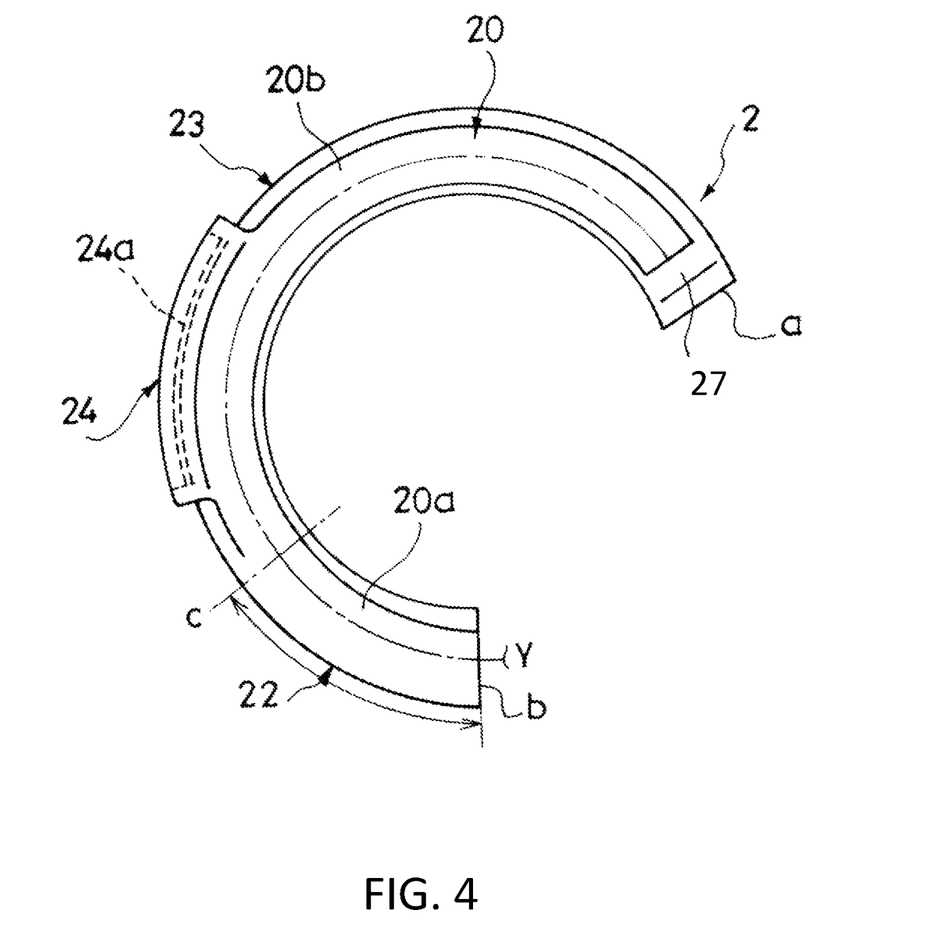
FIG. 4 is a top plan view illustrating a spring rubber seat.
Figure 5:
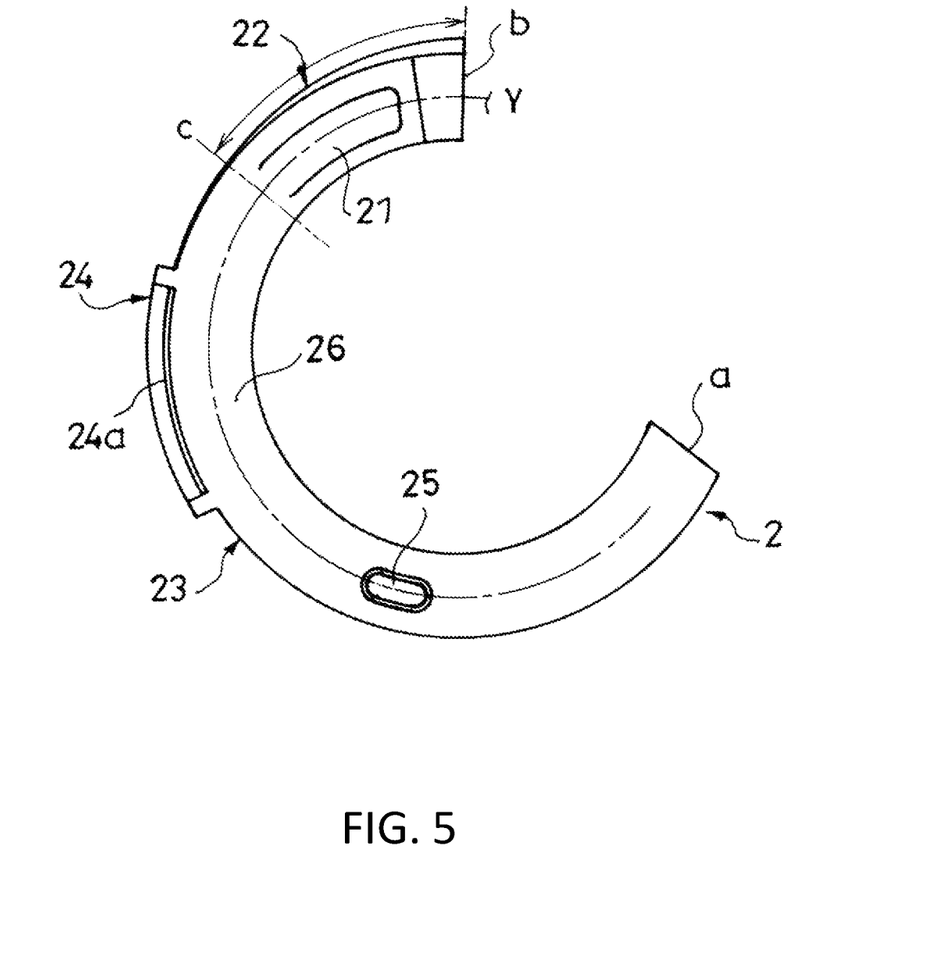
FIG. 5 is a bottom view illustrating the spring rubber seat.

The spring rubber seat 2 is formed of an elastic body such as rubber. As illustrated in FIGS. 4 and 5, the spring rubber seat 2 has an arc shape and is fitted to the support portion 12 of the spring seat 1.

In FIGS. 4 and 5, the one-dotted chain line Y indicates a center line of the wire rod of the suspension spring 120. On the upper portion of the spring rubber seat 2, a seat surface 20 where the suspension spring 120 is seated and a stopper 27 linked to one end of the seat surface 20 and protruded from the seat surface 20 are formed. The spiral portion of the suspension spring 120 is seated on the seat surface 20 in a state that a tip thereof abuts with the stopper 27.

Hereinafter, a stopper 27 side end of the spring rubber seat 2 will be referred to as a tip "a," and the opposite side end will be referred to as a distal end "b."

The seat surface 20 is formed from a termination (not shown) of the stopper 27 to the distal end "b" of the spring rubber seat 2. The spiral portion of the suspension spring 120 becomes apart from the seat surface 20 in the distal end "b." In addition, the seat surface 20 is inclined so as to be higher toward the distal end "b" within a predetermined range "b" to "c" from the distal end "b" of the spring rubber seat 2 to the side where the spiral portion of the suspension spring 120 abuts (refer to FIGS. 6 and 7).

Figure 6:
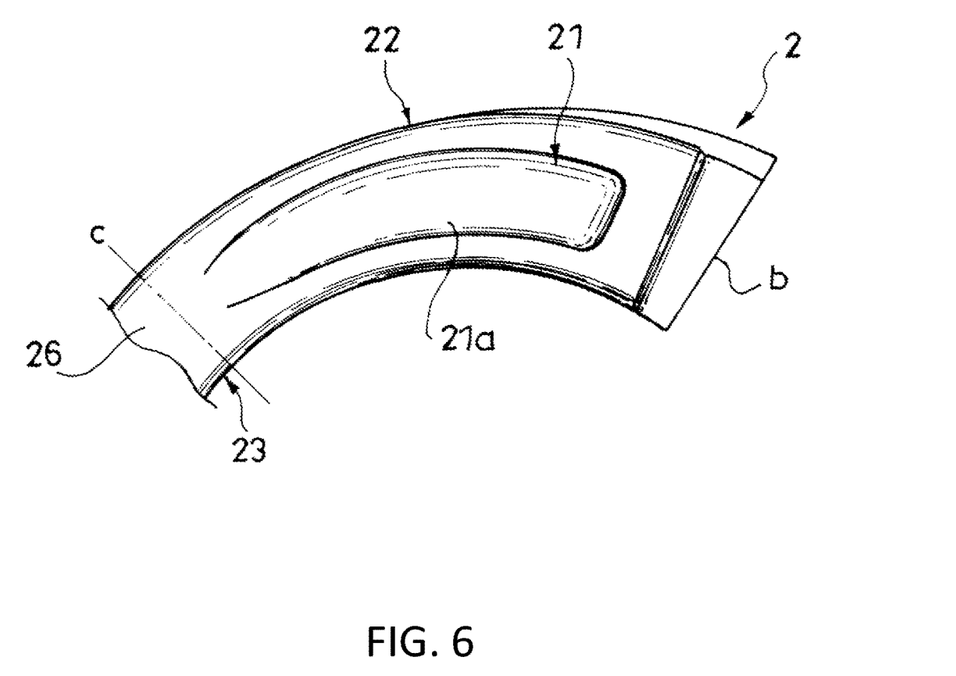
FIG. 6 is an enlarged view illustrating a concave portion of the spring rubber seat.

Hereinafter, in the spring rubber seat 2, a portion "b" to "c" including the inclined seat surface 20a will be referred to as a "seat surface inclined portion" 22, and a portion including the non-inclined seat surface 20b will be referred to as a "seat surface non-inclined portion" 23.

According to this embodiment, the spring rubber seat 2 is formed such that the stopper 27, the seat surface non-inclined portion 23, and the seat surface inclined portion 22 are linked sequentially from the tip "a" side to the distal end "b."

Note that, according to this embodiment, the spring rubber seat 2 is formed in an arc shape, and the stopper 27 and the seat surface inclined portion 22 are separated from each other. Alternatively, the spring rubber seat 2 may be formed in an annular shape by providing a connecting portion for connecting the stopper 27 and the seat surface inclined portion 22 to each other. In addition, a boundary "c" between the seat surface inclined portion 22 and the seat surface non-inclined portion 23 or circumferential lengths of the seat surface inclined portion 22 and the seat surface non-inclined portion 23 may change appropriately.

An outer circumferential portion of the seat surface non-inclined portion 23 is provided with a fitting portion 24 protruding to the outer circumferential side relative to other portions. In addition, the support piece 17a of the spring seat 1 is fitted to a groove 24a provided in the outer circumference of the fitting portion 24.

A single leg 25 inserted into one of the two lightening holes 15 of the spring seat 1 is provided under the seat surface non-inclined portion 23 in the lower part of the spring rubber seat 2. Using the leg 25 inserted into the lightening hole 15 and the support piece 17a fitted to the groove 24a, the spring seat 1 and the spring rubber seat 2 are prevented from relatively rotating in a circumferential direction.

If a portion of the spring rubber seat 2 abutting on the support portion 12 of the spring seat 1 is referred to as a seat portion 26, a lower end of the leg 25 protrudes downward relative to a lower end "d" of the seat portion 26 (refer to FIG. 7). As a result, the leg 25 is inserted into the lightening hole 15.

A single concave portion 21 is provided on the lower side of the seat surface inclined portion 22 in the lower part of the spring rubber seat 2. The concave portion 21 is depressed such that the bottom 21a does not abut on the support portion 12 of the spring seat 1 when the spring rubber seat 2 is not elastically deformed.

The periphery of the concave portion 21 is surrounded by the seat portion 26 abutting on the support portion 12 of the spring seat 1. For this reason, it is possible to suppress a foreign matter from entering a cavity R formed by the concave portion 21 from its side. Therefore, it is possible to suppress a foreign matter from staying in the cavity R and generating biting between the spring seat 1 and the spring rubber seat 2.

The spring rubber seat 2 is installed in the spring seat 1 by allowing the seat portion 26 to abut on the support portion 12, fitting the support piece 17a into the groove 24a, and inserting the leg 25 into the lightening hole 15. In this case, the concave portion 21 faces the lightening hole 15 where the leg 25 is not inserted.

For this reason, even when the periphery of the concave portion 21 of the spring rubber seat 2 is surrounded by the seat portion 26, the air can be supplied to or discharged from the cavity R formed by the concave portion 21 through the lightening hole 15 of the spring seat 1. As a result, it is possible to prevent an abnormal noise that may be generated by hermetically closing the cavity R.

Since the lightening hole 15 is placed on the lower side of the concave portion 21, condensation water can be rapidly discharged when dew condensation occurs. In addition, even when a foreign matter or water enters the cavity R from the lightening hole 15, it can be rapidly discharged.

Meanwhile, in the seat surface inclined portion 22 where the spiral portion of the suspension spring 120 becomes apart, the wire rod of the suspension spring 120 excessively vertically moves as the suspension spring 120 is expanded or compressed. For this reason, for example, when the suspension spring 120 is compressed to reduce an inclination angle of the wire rod, if the seat surface inclined portion 22 has high rigidity, the seat surface 20 fails to rapidly follow a motion of the wire rod. In this case, the spring rubber seat 2 hinders compression of the suspension spring 120 and affects a reaction force characteristic.

In contrast, in the spring rubber seat 2 according to this embodiment, the concave portion 21 is provided on the lower side of the seat surface inclined portion 22 to form the cavity R. This lowers the rigidity of the seat surface inclined portion 22. Therefore, it is possible to improve followability of the spring rubber seat 2 to deformation generated in the event of expansion or compression of the suspension spring 120.

The bottom 21a of the concave portion 21 is inclined to follow the inclination of the seat surface 20, and the depth of the concave portion 21 increases toward the distal end "b" of the spring rubber seat 2. For this reason, in the seat surface inclined portion 22, a vertical range of the cavity R that can be deformed in the event of compression of the suspension spring 120 increases toward the distal end "b." As a result, it is possible to further improve followability of the seat surface inclined portion 22 to deformation generated in the event of expansion or compression of the suspension spring 120.

An opening area of the lightening hole 15 of the spring seat 1 is smaller than an opening area of the concave portion 21. Therefore, it is possible to reliably obtain the area of the support portion 12 for receiving the spring rubber seat 2 and reduce the surface pressure. In addition, since the opening area of the lightening hole 15 is smaller, it is possible to suppress the spring rubber seat 2 from extruding from the lightening hole 15 when the spring rubber seat 2 is pressed. Therefore, it is possible to improve durability of the spring rubber seat 2. Alternatively, a plurality of holes having a small opening area may be formed to face the concave portion 21.

Note that the configuration of the spring rubber seat 2 is not limited to that described above and may change appropriately. For example, the shapes or the numbers of the concave portions 21, the fitting portions 24, and the legs 25 may change.

Next, the operations of the shock absorber 100 according to this embodiment will be described.

In the event of contraction of the shock absorber 100 in which the suspension spring 120 is compressed, the wire rod of the suspension spring 120 presses the seat surface 20 of the seat surface inclined portion 22, and the cavity R formed by the concave portion 21 is deformed. In contrast, in the event of expansion of the shock absorber 100 in which the suspension spring 120 is expanded, the wire rod of the suspension spring 120 rises. Therefore, by virtue of the elasticity of the seat surface inclined portion 22, the seat surface 20 follows the wire rod, and the concave portion 21 is recovered to its original shape. In this manner, the cavity R can be deformed or recovered depending on expansion or compression of the suspension spring 120. Therefore, it is possible to improve followability of the spring rubber seat 2 to deformation generated in the event of expansion or compression of the suspension spring 120. Accordingly, it is possible to prevent a gap from being generated between the suspension spring 120 and the seat surface 20 or suppress the spring rubber seat 2 from hindering compression of the suspension spring 120.

When the cavity R is deformed or recovered, the air can move between inside and outside of the cavity R through the lightening hole 15 of the spring seat 1. Therefore, even when the periphery of the concave portion 21 is surrounded by the seat portion 26, abnormal noise that may be generated by a flow of the air does not occur. In addition, condensation water can be rapidly discharged from the lightening hole 15 even when dew condensation occurs.

The cavity R formed by the concave portion 21 communicates with the outside air side through the lightening hole 15. Since the concave portion 21 is opened downward, a foreign matter or water that may enter the cavity R from the outside air side can be rapidly discharged.

Next, advantageous effects of the shock absorber 100 according to this embodiment will be described.

According to this embodiment, the bottom 21a of the concave portion 21 is inclined to follow the inclination of the seat surface 20.

In this configuration, a vertical range of the cavity R that can be deformed in the event of compression of the suspension spring 120 increases toward the distal end "b" in which a vertical movement depending on the movement of the wire rod of the suspension spring 120 is maximized. Therefore, it is possible to further improve followability of the seat surface inclined portion 22 to deformation generated in the event of expansion or compression of the suspension spring 120. Note that the shape of the concave portion 21 is not limited to that described above and may change appropriately.

According to this embodiment, the opening area of the lightening hole 15 formed in the spring seat 1 is smaller than that of the concave portion 21 formed in the spring rubber seat 2.

In this configuration, the opening area of the lightening hole 15 is reduced. Therefore, it is possible to reliably obtain the area of the support portion 12 of the spring seat 1 for receiving the spring rubber seat 2 and reduce the surface pressure. In addition, it is possible to suppress the spring rubber seat 2 from extruding from the lightening hole 15 when the spring rubber seat 2 is pressed to the lightening hole 15. Therefore, it is possible to improve durability of the spring rubber seat 2. Note that the size of the lightening hole 15 of the spring seat 1 is not limited to that described above and may change appropriately.

According to this embodiment, the spring seat 1 has a plurality of lightening holes 15 shaped and arranged axially symmetrically. The spring rubber seat 2 has the leg 25 that inserted to one of the holes 15 while the concave portion 21 faces one of the plurality of lightening holes 15, is inserted to the other lightening holes 15.

In this configuration, the lightening holes 15 formed in the spring seat 1 can be used for both inserting leg 25 and facing the concave portion 21. Therefore, both a spring rubber seat 2 for a right-hand wound suspension spring and a spring rubber seat (not shown) for a left-hand wound suspension spring can be installed in a single type of the spring seat 1. Note that the shape or the number of lightening holes 15 formed in the spring seat 1 is not limited to those described above and may change appropriately. In addition, the configuration of the spring rubber seat 2 may also change appropriately. For example, the leg 25 may be removed as long as a relative circumferential rotation between the spring seat 1 and the spring rubber seat 2 can be prevented without inserting the leg 25 into the lightening hole 15. In this case, a single lightening hole 15 may be provided only for facing the concave portion 21.

According to this embodiment, the spring seat 1 has the two lightening holes 15 formed to vertically penetrate, and one of the two lightening holes 15 faces the concave portion 21 of the spring rubber seat 2.

In this configuration, even when the periphery of the concave portion 21 of the spring rubber seat 2 is surrounded by the portion abutting on the spring seat 1 (the seat portion 26), the air can be supplied to or discharged from the cavity R formed by the concave portion 21 though the lightening hole 15 of the spring seat 1. Therefore, it is possible to prevent an abnormal noise that may be generated by hermetically closing the cavity R. In addition, since the lightening hole 15 is placed on the lower side of the concave portion 21, condensation water can be rapidly discharged even when dew condensation occurs. Furthermore, even when a foreign matter or water enters the cavity R formed by the concave portion 21, it can be rapidly discharged from the lightening hole 15. Note that the configuration of the spring seat 1 may appropriately change. For example, the spring seat 1 may be provided with a plurality of lightening holes 15 for facing the concave portion. Alternatively, the lightening hole 15 for facing the concave portion 21 may be omitted, and only the lightening hole 15 for inserting the leg 25 may be provided. Alternatively, both the lightening hole 15 for facing the concave portion 21 and the lightening hole 15 for inserting the leg 25 may be omitted as well.

According to this embodiment, the shock absorber 100 includes the shock absorber body 110, the suspension spring 120 provided in the outer circumference of the shock absorber body 110, the spring seat 1 installed in the outer circumference of the shock absorber body 110 to support the lower end of the suspension spring 120, and the spring rubber seat 2 interposed between the spring seat 1 and the suspension spring 120 and having the seat surface 20 where the suspension spring 120 is seated. The seat surface 20 of the spring rubber seat 2 is inclined so as to be higher toward the distal end "b" within a predetermined range "b" to "c" from the distal end "b" where the spiral portion of the suspension spring 120 becomes apart to the side where the spiral portion of the suspension spring 120 abuts. On the lower side of the predetermined range "b" to "c" in the lower part of the spring rubber seat 2, the concave portion 21 surrounded by the portion abutting on the spring seat 1 (seat portion 26) is formed.

In this configuration, the concave portion 21 is provided on the lower side of the predetermined range "b" to "c" in the lower part of the spring rubber seat 2, that is, on the lower side of the portion where the inclined seat surface 20a is formed (seat surface inclined portion 22) to lower the rigidity in this portion. Therefore, it is possible to improve followability to deformation generated in the event of expansion or compression of the suspension spring 120. In addition, since the outer circumference of the concave portion 21 abuts on the spring seat 1, it is possible to suppress a foreign matter from entering the cavity R formed by the concave portion 21 from its side. Therefore, it is possible to suppress biting of a foreign matter in a gap between the spring rubber seat 2 and the spring seat 1.

The embodiments of the present invention described above are merely illustration of some application examples of the present invention and not of the nature to limit the technical scope of the present invention to the specific constructions of the above embodiments.

For example, although the spring seat 1 is formed of a metal material in the embodiments described above, the spring seat 1 may be formed of any material other than the metal.

The present application claims a priority based on Japanese Patent Application No. 2014-67926 filed with the Japan Patent Office on Mar. 28, 2014, all the contents of which are hereby incorporated by reference.

The invention claimed is:

1. A shock absorber, comprising:
a shock absorber body;
a suspension spring provided in an outer circumference of the shock absorber body;
a spring seat installed in the outer circumference of the shock absorber body and configured to support a lower end of the suspension spring; and
a spring rubber seat interposed between the spring seat and the suspension spring and provided with a seat surface on which the suspension spring is seated, wherein
the seat surface of the spring rubber seat is formed inclined so as to be higher toward a distal end within a predetermined range from the distal end where a spiral portion of the suspension spring becomes apart to a side where the spiral portion of the suspension spring abuts,
a concave portion surrounded by a portion abutting on the spring seat is formed on a lower side of the predetermined range in a lower part of the spring rubber seat,
the concave portion has walls inwardly spaced from a boundary of the spring rubber seat,
the spring seat has one or more holes formed to vertically penetrate the spring seat, and at least one of the holes faces the concave portion of the spring rubber seat, and
an entire circumference of the at least one hole that faces the concave portion is completely located within a boundary of the concave portion.

2. The shock absorber according to claim 1, wherein
the spring seat has the holes shaped and arranged axially symmetrically, and
the spring rubber seat has a leg that, while the concave portion faces one of the plurality of holes, is inserted into one of the other holes.

3. The shock absorber according to claim 1, wherein
an opening area of the hole is smaller than that of the concave portion.

4. The shock absorber according to claim 1, wherein
a bottom of the concave portion is inclined to follow an inclination of the predetermined range of the seat surface.

* * * * *